May 24, 1932. M. B. TARK ET AL 1,860,300
SLUDGE BED CLEANING APPARATUS
Original Filed Dec. 13, 1928 10 Sheets-Sheet 2

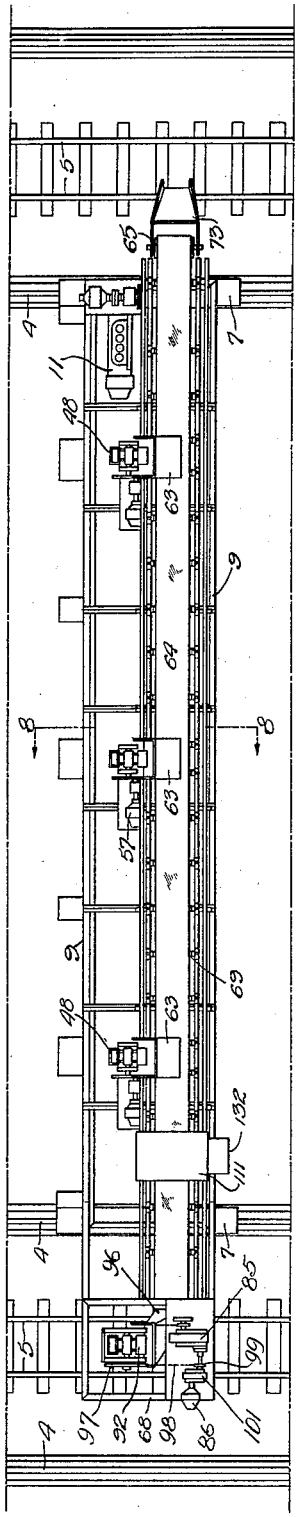

Inventors:
Marcus B Tark
Roland I. Cleveland
by their Attorneys
Howson & Howson

May 24, 1932. M. B. TARK ET AL 1,860,300
SLUDGE BED CLEANING APPARATUS
Original Filed Dec. 13, 1928 10 Sheets-Sheet 3
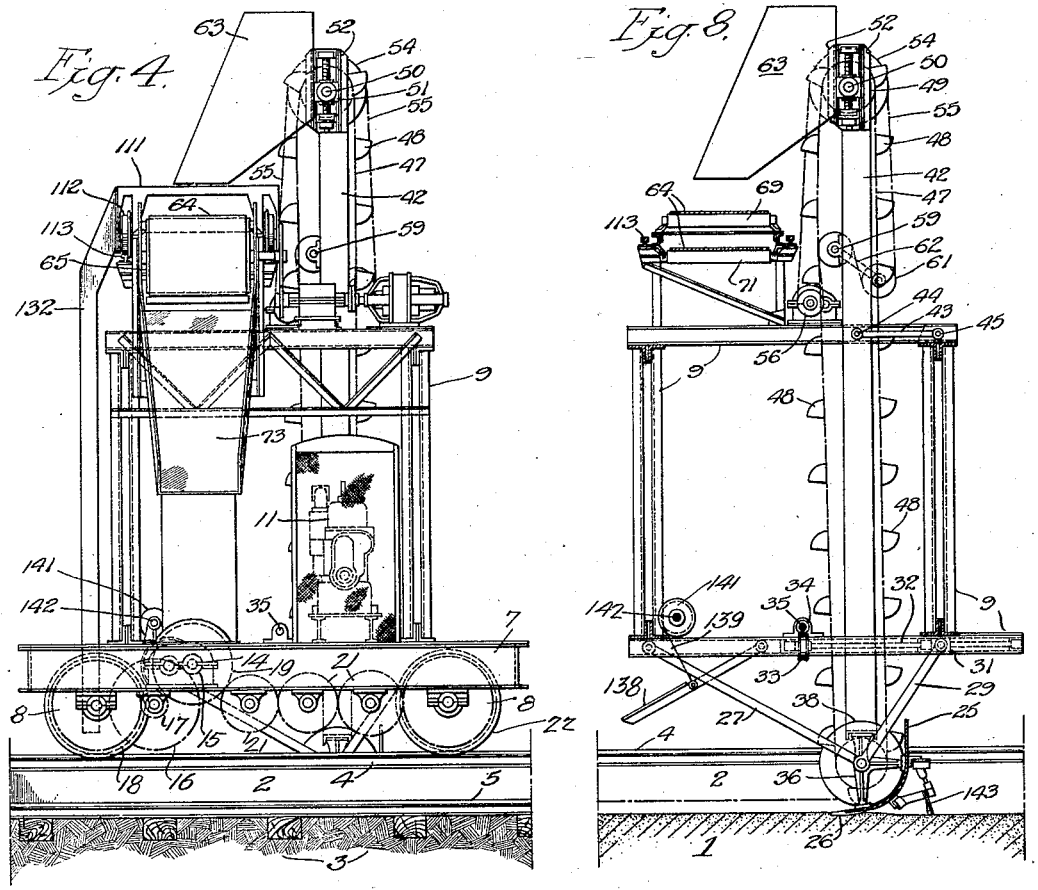
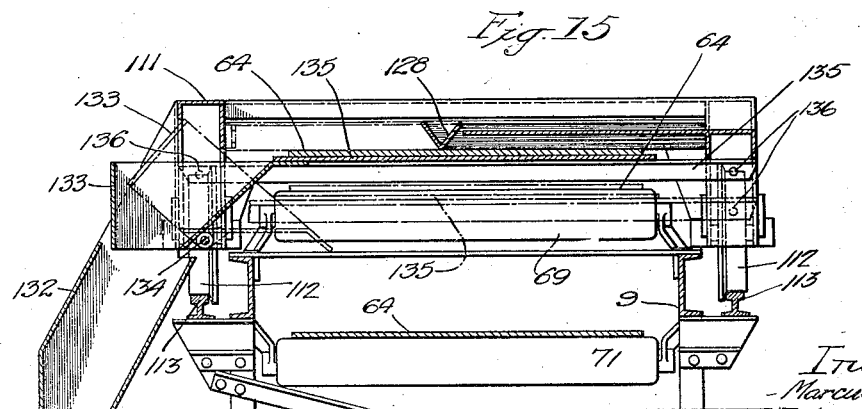

May 24, 1932. M. B. TARK ET AL 1,860,300
SLUDGE BED CLEANING APPARATUS
Original Filed Dec. 13, 1928 10 Sheets-Sheet 4
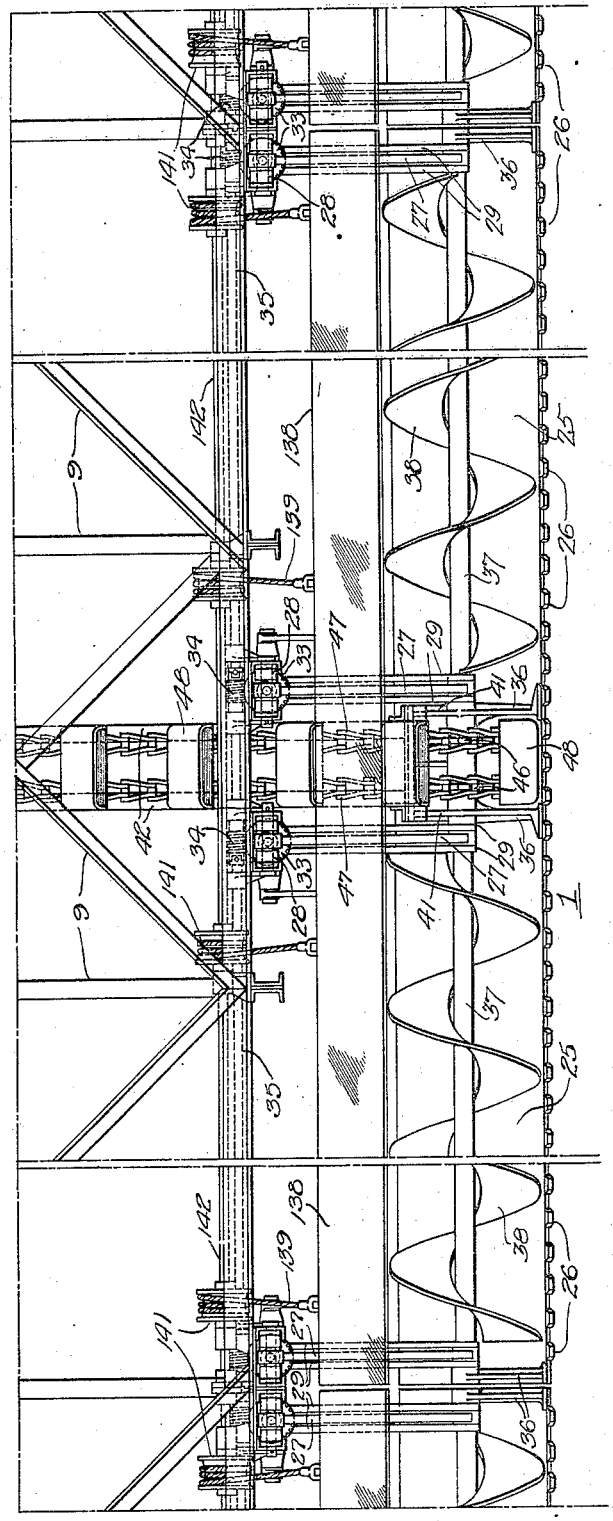
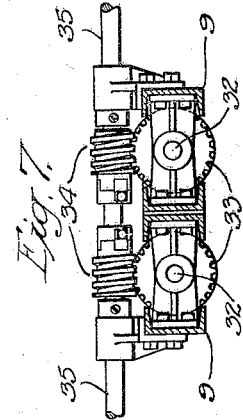
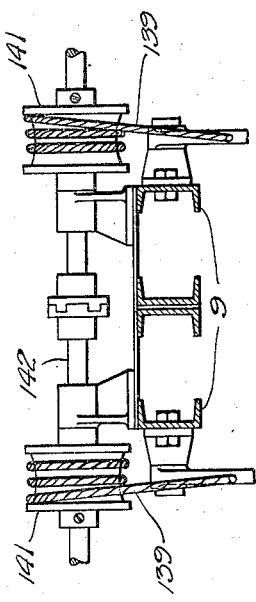

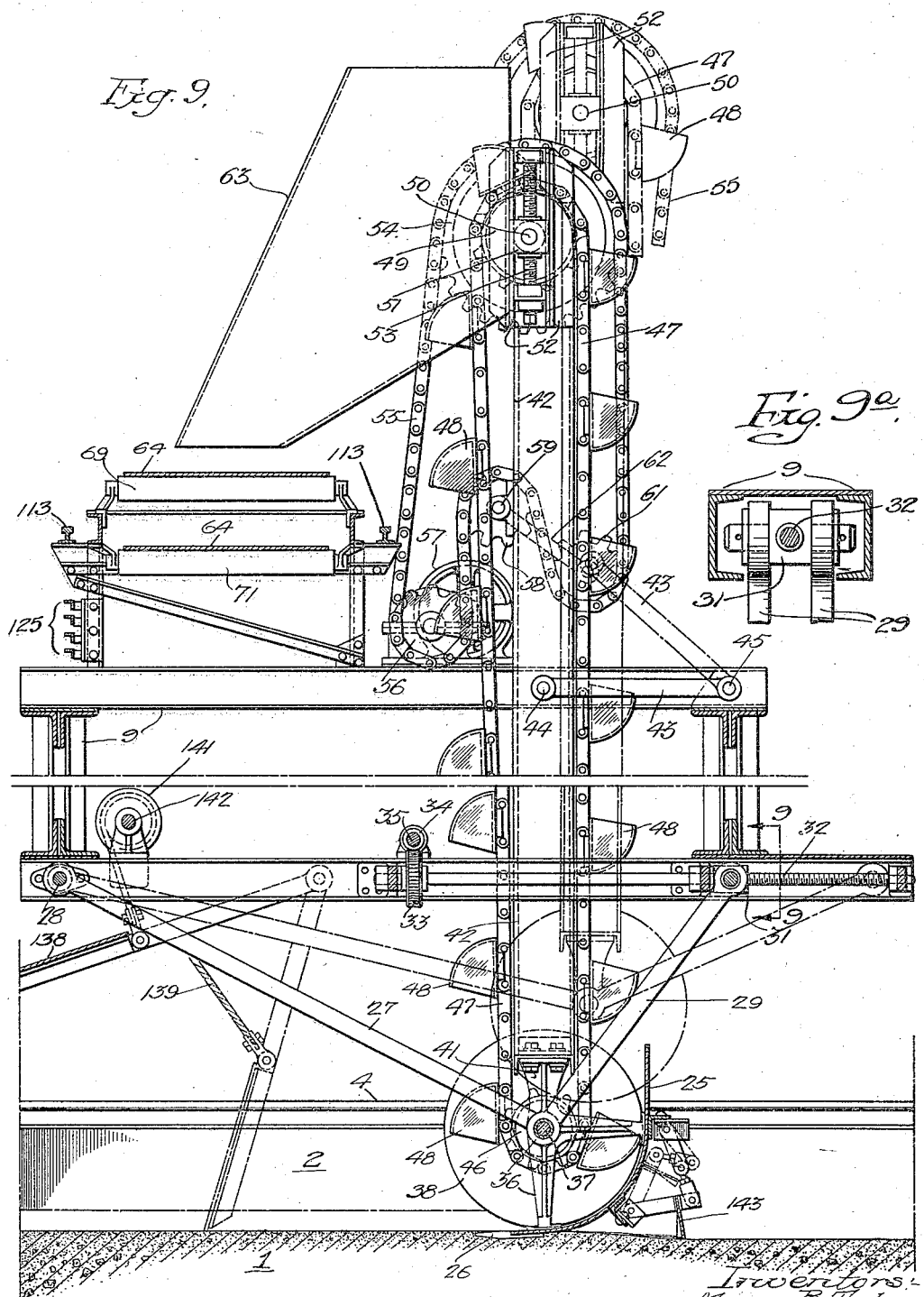

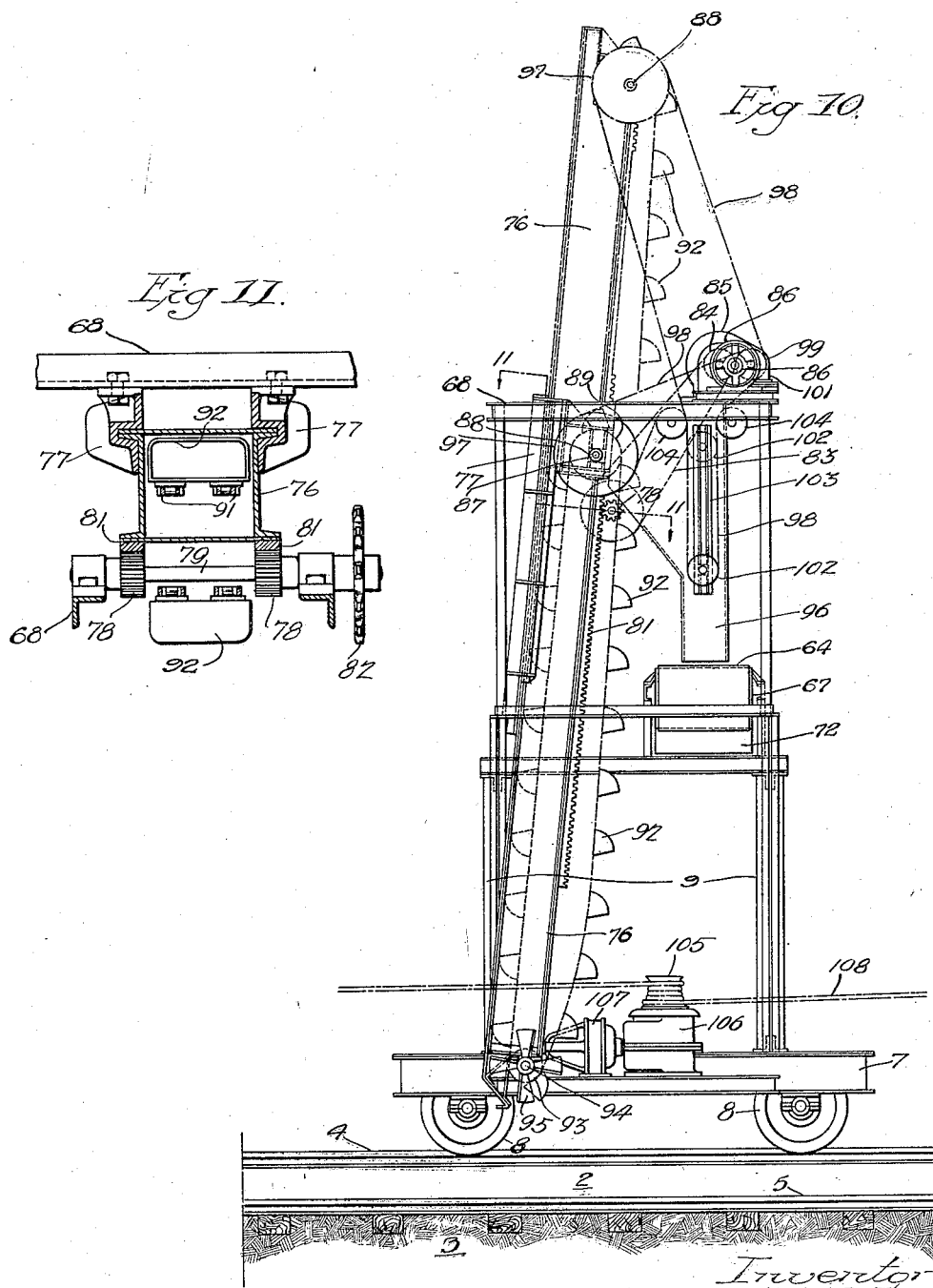

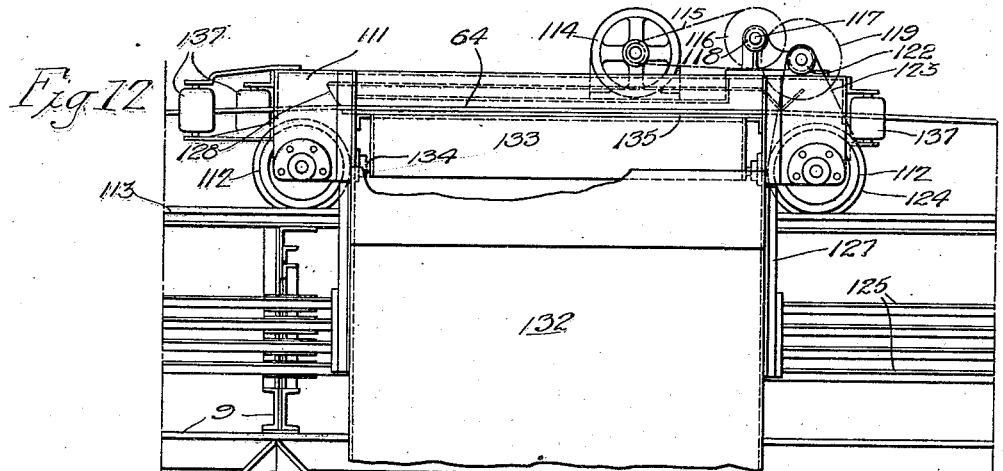
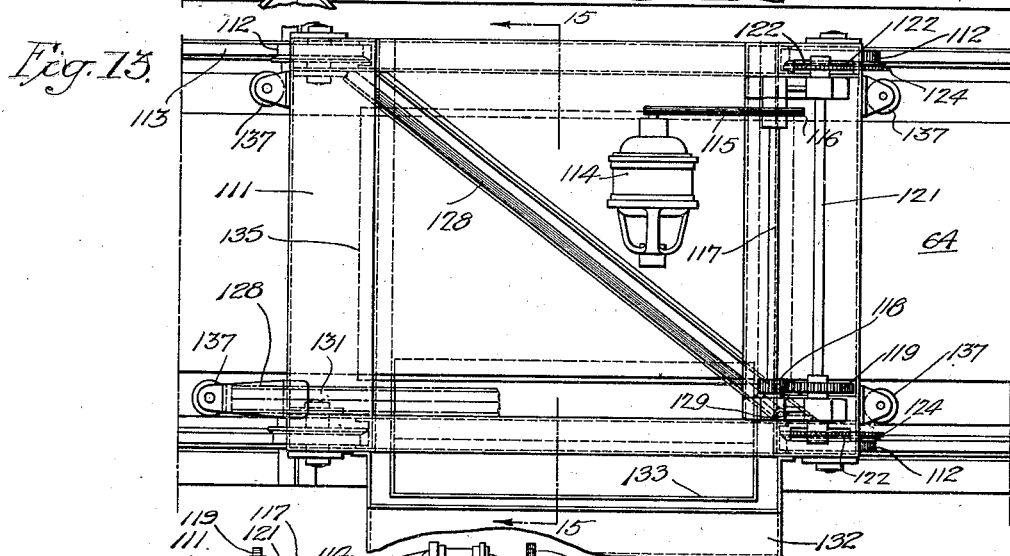
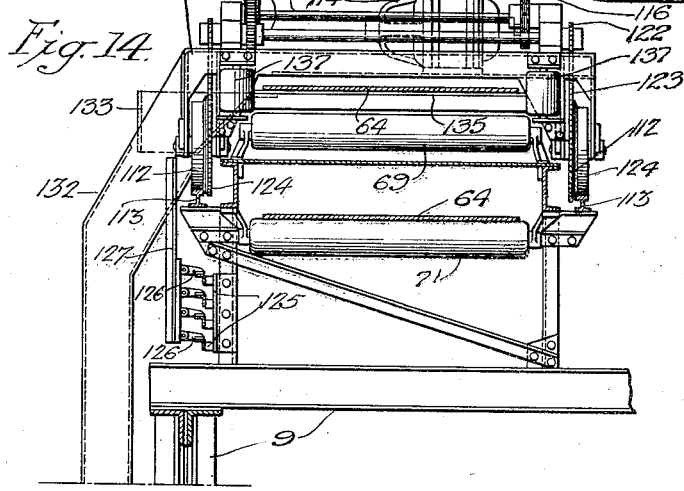

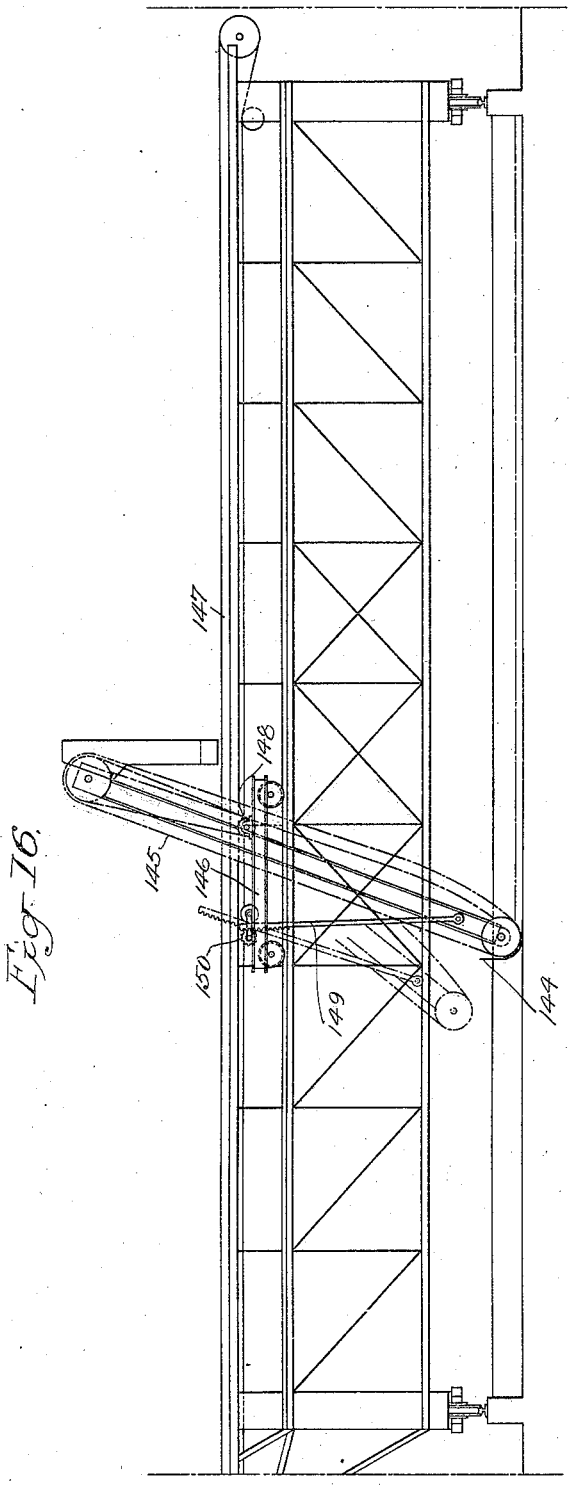

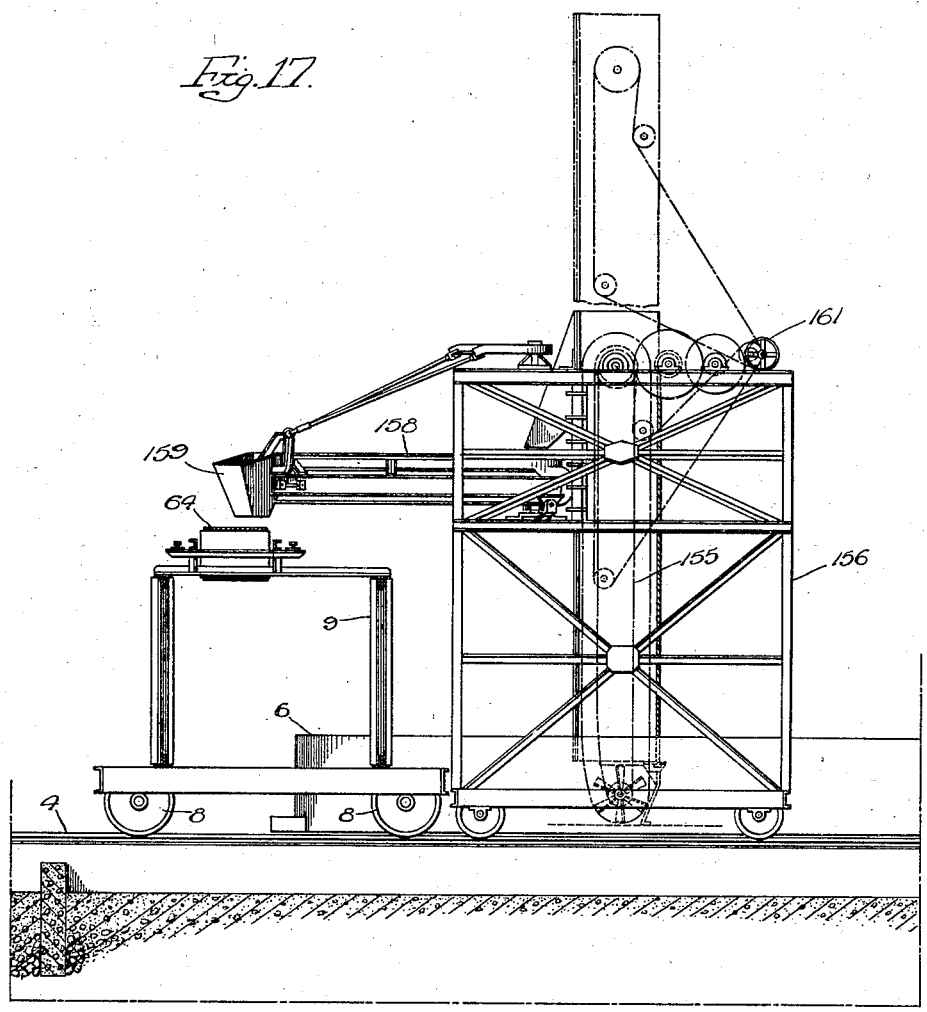

May 24, 1932.  M. B. TARK ET AL  1,860,300

SLUDGE BED CLEANING APPARATUS

Original Filed Dec. 13, 1928  10 Sheets-Sheet 10

Patented May 24, 1932

1,860,300

UNITED STATES PATENT OFFICE

MARCUS B. TARK AND ROLAND L. CLEVELAND, OF PHILADELPHIA, PENNSYLVANIA, ASSIGNORS TO LINK-BELT COMPANY, OF CHICAGO, ILLINOIS, A CORPORATION OF ILLINOIS

SLUDGE BED CLEANING APPARATUS

Application filed December 13, 1928, Serial No. 325,759. Renewed January 29, 1932.

This invention relates to improvements in sewage disposal systems and apparatus, and the principal object of the invention is to provide novel and highly efficient mechanical means for cleaning the sand or other sludge-drying beds of the accumulated surface sludge and for retaining the beds in proper condition for continuous and effective operation.

More specifically, the principal object of the invention is to provide mechanical means for clearing the surfaces of the said beds of the accumulated sludge without materially disturbing the beds themselves and for applying fresh sand to the beds when required and for maintaining the beds in a proper level condition for further operation.

To this general end, the invention contemplates the provision of novel mechanism and apparatus adapted to travel over the beds and to skim from the surfaces thereof the accumulated sludge without materially disturbing the bed or removing any substantial portion of the sand, and to deposit the sludge in suitable vehicles or in railroad cars adapted to travel adjacent and parallel to the said sludge-collecting apparatus, said mechanism and apparatus also preferably including means for taking up sand from a suitable source and for spreading and leveling the sand on the beds to compensate any losses in the sludge-removing operation.

The invention further resides in various novel mechanical details and structural features hereinafter set forth and illustrated in the attached drawings, in which:

Figure 1 is a front elevation of apparatus made in accordance with our invention illustrating also a preferred form of sludge bed construction to which the mechanism is particularly well adapted;

Fig. 2 is a plan view of the mechanism shown in Fig. 1;

Fig. 4 is an end elevation of the apparatus from that end shown in Fig. 3;

Fig. 5 is an enlarged elevational view of an intermediate portion of the apparatus;

Figs. 6 and 7 are fragmentary sectional views illustrating details of the mechanism;

Fig. 8 is a section on the line 8—8, Fig. 2;

Fig. 9 is a view similar to Fig. 8 enlarged to show the structural details;

Fig. 9a is a sectional view on the line 9—9, Fig. 9;

Fig. 10 is an elevational view illustrating details of the elevator mechanism which is mounted at one end of the apparatus shown in Fig. 1;

Fig. 11 is a section on the line 11—11, Fig. 10;

Fig. 12 is a fragmentary front elevational view of the sand-distributing device;

Fig. 13 is a plan view of that part of the mechanism shown in Fig. 12;

Fig. 14 is an end elevation of those portions of the apparatus shown in Figs. 12 and 13;

Fig. 15 is a section on the line 15—15, Fig. 13;

Fig. 16 is a more or less diagrammatic view illustrating a modification within the scope of the invention;

Fig. 17 is an end elevational view illustrating a further modification, and

Figure 3:
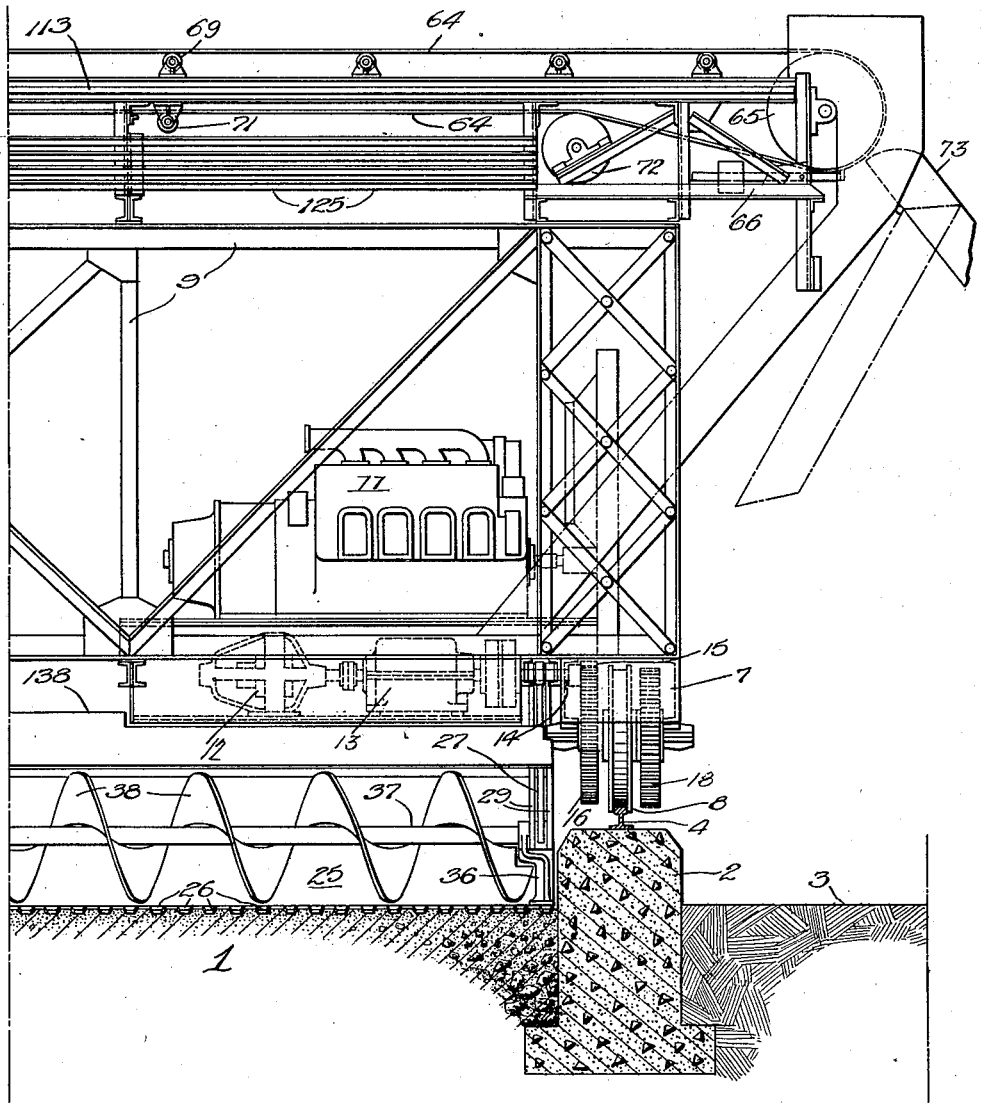
Fig. 3 is an enlarged elevational view of one end of the apparatus shown in Fig. 1.

Referring to Fig. 1 of the drawings, a sand bed made in accordance with the present invention consists of one or more sections 1 bounded by low walls 2, each section being separated or spaced apart from its adjacent section or sections by an intermediate space or spaces 3. The walls 2 constitute supports, in the present instance, for rails 4 upon which is mounted and adapted to travel sludge-collecting mechanism, as hereinafter described, while in the spaces 3 intermediate the bed sections are established rails 5 of suitable gage accommodating railway cars 6, which as hereinafter set forth are adapted to receive the sludge collected and removed from the beds and which may also be used to carry in sand which is distributed over the surfaces of the sludge beds, also as hereinafter set forth. Preferably the beds are so constructed that the sludge-collecting mechanism supported upon the rails 4, 4 and spanning the individual beds bounded by the walls 2 may be moved upon the supporting rails from one bed section to another so that a single mechanism of this type may be utilized in conjunction with a drying bed composed of any number of the individual sections 1.

The sludge-collecting and sand-distributing mechanism comprises a body or main frame 7, which as shown in Figs. 4 and 10 is supported at each end by a pair of wheels 8, 8, which travel upon the rails 4. The body 7 carries a superstructure 9 which in the present instance is fabricated of steel bars of suitable cross sectional form which with the base 7 supports the various working parts of the mechanism. At one end of the frame 7 is mounted a motor generator set 11 which furnishes the electrical power by means of which the frame and superstructure and associated parts are caused to travel on the rails 4, and energy from this source is also employed for operating the various other working parts of the apparatus as a whole. In the present instance, reference being had to Figs. 3 and 4, we provide an electric motor 12 which through suitable reduction gearing enclosed within a housing 13 is connected with a shaft 14 which carries at one end a pinion 15 meshing with a gear 16 mounted upon or journaled in the frame 7, the gear 16 being carried by a shaft which also carries a pinion 17 meshing with a gear 18 upon the axle of one of the wheels 8, and the shaft 14 also carries a gear 19 which through an intervening train of gears 21 journaled on the frame is connected with a gear 22 on the axle of the other of the wheels at that side of the frame. The motor 12, therefore, constitutes the driving motor for the traveling bridge consisting of the frame 7 and superstructure 9. While in the present instance we have shown but one of these driving motors, it is apparent that a similar motor and similar driving gear may be applied to the opposite end also of the machine.

Suspended from the bridge and extending longitudinally thereof and transversely between the walls 2, 2 is a forwardly curved plate 25, this plate having at its forward and lower end teeth 26 which in operation are adapted to project under the layer of sludge and at the level of the top of the sand bed. As the bridge travels forwardly on its rails, the sludge is caused to slide upwardly on the fingers 26 and into the curve of the plate 25, and is thus in effect skimmed from the bed without materially disturbing the latter and without removing any substantial portion of the sand of which the beds are formed. It will be apparent that the sand will pass freely between the teeth and tends to stay on the bed, whereas the heavier and more compact sludge will slide up the teeth onto the skimmer plate.

In the present instance, the plate 25 consists of three longitudinally aligned sections each of which is supported from the bridge by means of four sets of suspension rods, each set consisting as shown in Fig. 9 of a forward single bar 27 pivotally secured to the frame at 28 and a rear double bar 29 pivotally secured at opposite sides of a nut 31 on a screw 32, this screw being journaled in the frame and having at one end a worm wheel 33 which meshes with a worm 34 secured through a clutch, see Fig. 7, to a shaft 35 extending longitudinally of the frame. As shown in Fig. 9, each of these sets of rods 27—29 support at their juncture a spider 36 consisting of two arms which attach to the forward face of the plate 25. As shown in Fig. 5, two of the sets of supporting rods 27—29 support the ends of the section with which they are associated, while the other two sets occupy positions in spaced relation adjacent the center of the section. The spiders 36 associated with the central sets of arms may be and preferably are formed integrally as illustrated.

These sets of arms 27 and 29 also constitute at their juncture bearings for a shaft 37 which in the present instance is composed of three sections in alignment, these sections corresponding in length with the sections of the scoop plate 25. Each of the shaft sections 37 is provided with a helical vane which with the shaft constitutes a ribbon conveyer by means of which the sludge taken up on the skimming plate 25 as previously described is shifted transversely and concentrated at the center position of each of the sections. For this purpose, the vanes 38 associated with each of the shaft sections are in two parts, right and left-hand, which extend substantially from the outer ends of the respective shaft sections to points adjacent the center of the section, as clearly illustrated. It will be apparent that by turning the screw 32, the nut 31 may be advanced or retracted in such manner as to elevate or lower the shaft sections 37 and the associated skimmer sections 25, and in Fig. 9, we have illustrated in broken lines these parts in an elevated position.

The central pair of spiders 36 of each of the scoop sections is extended upwardly as indicated at 41 in Figs. 5 and 9 to afford supports or pedestals for a pair of upright channels 42, which channels constitute a supporting frame for a vertical conveyer or elevator which operates as hereinafter set forth in conjunction with the skimmer 25 and the ribbon conveyer 37—38 to remove and to elevate the sludge collecting at the center portion of the scoop section, as previously described. As illustrated in Fig. 9, the frame channels 42 are supported at the bottom upon the bracket 41 and at its mid section by arms or links 43 pivotally connected to said channels at 44 and at their other ends 45 to the frame of the traveling bridge. These links 43 while not supporting the actual weight of the frame channels 42 maintain the channels in a normal upright position.

Intermediate the arms 41 of the central set of spiders 36 of the respective sections, the associated section of the shaft 37 carries a pair of sprockets 46 upon which operate a pair of chains 47, 47 which jointly carry a set of buckets 48 and which with the buckets constitute the elevator conveyer by means of which the sludge is elevated. As illustrated in Fig. 9, the buckets 48 are adapted to sweep inwardly and upwardly over the center portions of the skimmer sections 25 to pick up the sludge collected at these points. At the top of the frame 42, the chains 47, 47 operate around sprockets 49, these sprockets being supported on a shaft 50 journaled in bearings 51 adjustably supported in upright guides 52 at the tops of said frame channels 42. As shown in Fig. 9, these bearings 51 are supported by screws 53 rotatably mounted between the guides 52, 52 and affording means for vertically adjusting the bearings and the sprockets 49. Also carried by the shaft 50 is a sprocket 54 which through a sprocket chain 55 is connected with a sprocket 56 which through suitable transmission gearing is connected with an electric motor 57 mounted on the bridge and constituting the driving means for the conveyer 47—48. The chain 55 also passes around a sprocket 58 journaled at 59 on the frame 42, and an idler sprocket 61 engages the chain intermediate the sprocket 58 and the sprocket 54, which idler is carried on the end of a bar 62 pivotally secured to the frame. This idler 61, by reason of the pivotal mounting of the arm 62, functions as an automatic compensator taking up the slack in the drive chain 55 and compensating for the changes in the relative positions of the sprockets 54 and 58 and the drive sprocket 56 when the conveyer 47—48 is elevated with the frame 42, which occurs when the skimmer 25 and shaft 37 are elevated, as previously described. In Fig. 9, we have illustrated in broken lines the position of the elevator frame and parts in the elevated positions. It will be apparent how the sprocket compensates for the relative movements of the associated parts while at the same time maintaining a proper tension in the chain 55.

As previously set forth, one of these elevator conveyers is located at the central point of each of the sections of the skimmer 25, and the assembled structure is well illustrated in Fig. 1.

At the top of each of the elevator conveyers 47—48, the buckets empty into a chute 63, and these chutes conduct the sludge onto a belt conveyer 64 which extends longitudinally of the traveling bridge above the superstructure. As shown in Figs. 1 and 3, the belt 64 operates at one end around a pulley 65 journaled in an overhanging portion 66 of the superstructure of the traveling bridge, and at the other end about a pulley 67 also journaled in an overhanging superstructure part 68. Suitable rollers 69 and 71 are provided on the superstructure to normally support the upper and lower runs respectively of the belt 64, and adjacent and at each end guide pulleys 72 are provided to guide the lower run of the conveyer in the desired path to and from the pulleys 65 and 67. The sludge material deposited upon this belt through the chutes 63, as previously described, is carried to the end and delivered into a chute 73 which guides it to a car 6 located on the tracks 5, as previously set forth. By reference to Fig. 3, it will be noted that the chute 73 is hinged to permit it to be swung downwardly from the inoperative position, as indicated in broken lines.

By the mechanism aforedescribed, it will be apparent that the bridge structure may be advanced across the sand beds, and that by means of the skimmers 25, the associated ribbon and elevator conveyers and the transverse belt conveyer 64, the sludge may be taken up from the beds and deposited directly into a railroad car or other vehicle for removal to a proper place of deposit. The mechanism also provides for elevation and vertical adjustment of the skimmer as required, and to permit the travel of the bridge structure as a whole from one sand bed unit to another.

With a device of this character, it is inevitable that the sand bed will be disturbed by the removal of the sludge as above described. Provision accordingly is made in the present instance to recondition the sand beds following removal of the sludge by depositing new sand where necessary and to smooth and level the surface of the beds. For this purpose, we provide in the overhanging end part 68 of the superstructure of the traveling bridge an elevator conveyer which is adapted to take up sand from a railroad car or any suitable conveying vehicle, to elevate the sand, and to deposit it upon the belt conveyer 64 for distribution upon the beds, as hereinafter set forth.

This elevator conveyer is shown in Figs. 1, 10 and 11. It consists as shown of a hollow vertical frame 76 slidably mounted in upright guides 77 secured in the overhanging structure 68 of the traveling bridge. The frame 76 is normally supported and is adjustable in the guide 77 by pinions 78 on a shaft 79 journaled on the frame, which pinions engage racks 81, 81 on the forward face of the frame 76. As illustrated in Figs. 10 and 11, the shaft 79 carries a sprocket 82 which is connected through a chain 83 with a sprocket 84 operatively connected through suitable reduction gearing 85 with an electric motor 86 mounted at the top of the bridge extension 68. It will be apparent that in this manner the entire frame 76 may be bodily elevated, or lowered at will into the operative position. The frame 76 carries at its upper end bearings 87 for a shaft 88, which shaft carries a pair of sprockets 89 about which operate the two conveyer chains 91, 91 which carry buckets 92. These chains at the bottom of the frame 76 operate on sprockets 93 carried upon a shaft 94 suitably journaled in the lower end of the frame 76, this shaft 94 being extended at each side of the conveyer and having on the said extensions blades 95 which when the shaft is rotated function to feed the material with which they contact inwardly towards the buckets 92, which latter function to take up the material and to deposit it at the top of the conveyer into a chute 96, see Fig. 1, which directs the said material onto the end of the belt conveyer 64. The chains 91 and buckets 92 are actuated through the medium of a sprocket 97 on one end of the upper conveyer shaft 88, this sprocket 97 being connected through a chain 98 with a sprocket 99, which latter sprocket is connected through suitable reduction gearing 101, see Fig. 2, with the motor 86. This chain 98, as shown in Fig. 10, passes around an idler sprocket 102 which slides vertically in upright guides 103 on the side of the chute 96.

In Fig. 10, the conveyer frame 76 is shown in full lines in a depressed and operative position, while the upper portion thereof is shown in broken lines in the elevated or inoperative position. When so elevated, the sprocket 102 compensates for the different distances between the sprocket 88 and the sprocket 97, the sprocket 102 in this adjustment moving upwardly in its guides to the position indicated in broken lines. Relatively fixed or guide sprockets 104 are also provided to guide the chain in the various positions of the associated main sprockets. This arrangement provides for a continuous operative connection between the elevator conveyer and the motor 86, regardless of the adjusted position of said conveyer.

As indicated in Fig. 1, the lower end of the conveyer is adapted to be lowered into a car containing sand on one of the tracks 5 at that end of the bridge structure. In order to move the cars relatively to the conveyer to insure that all parts of the interior of the car shall come into operative relation with the conveyer, we provide upon the frame 7, as best shown in Fig. 10, a motor driven gypsey 105, the gypsey head being connected through suitable reduction gearing 106 to an electric motor 107 as illustrated. A rope or cable 108 passed around the gypsey head is connected at its opposite ends to the opposite ends of the car or series of cars which carry the sand and in which the aforesaid elevator conveyer operates. By operating the motor 107, the cars may be advanced with respect to the elevator at a predetermined rate so that practically the entire contents of the car may be removed without hand work. This device for affording relative movement of the car and the conveyer operates entirely independently of the movement of the bridge as a whole so that the feeding of sand from the car to the conveyer belt 64 may be a continuous one synchronized with the movement of the bridge structure over the sand beds.

In order to insure a desired distribution of sand over the bed, we provide in operative association with the belt conveyer 64 a combined plow and chute which is adapted to move longitudinally of the belt during the normal operation of the latter and to discharge the sand from the conveyer through the chute onto the sand bed. The details of this plow device are illustrated in Figs. 12 to 15, inclusive. As therein illustrated, this device comprises a carriage 111 the wheels 112 of which travel on rails 113 which extend longitudinally of the bridge and on opposite sides of the conveyer 64. This carriage is actuated on the rails by means of an electric motor 114 mounted on the carriage which is connected through a chain 115 with a sprocket 116 on a transverse shaft 117 journaled on the carriage, and this shaft carries a pinion 118 which meshes with a gear 119 upon a second transverse shaft 121, which shaft carries at each end a sprocket 122, each of which is connected through a chain 123 with a sprocket 124 connected respectively with two of the wheels of the carriage, as shown in Figs. 13 and 14. Electrical power is carried to the motor 114 through electric rails 125 secured to the superstructure of the bridge below and paralleling the rails 113 and through shoes 126 on a depending arm 127 on the carriage 111. In the present instance, two pairs of rails are provided affording a selective operation of the motor 114 in either direction, a suitable switch controlling in this manner the movement of the carriage 111 in both directions.

As clearly illustrated in Figs. 14 and 15, the carriage 111 supported on its wheels 112 is adapted to bridge or straddle the upper run of the conveyer 64, and carries at a point above the normal level of the upper run of the conveyer a deflector element 128 hinged at 129 to the carriage and adapted to be adjusted from a position to one side of and paralleling the upper run of the conveyer 64, as indicated in broken lines at the point 131, Fig. 13, to the diagonal position, as shown in full lines in that figure, extending completely across the belt. This deflector under conditions hereinafter set forth is adapted to engage and sweep the upper surface of the belt conveyer and to divert the sand or other material thereon into a chute 132 which conducts the material downwardly and discharges it onto the sand bed in advance of the bridge structure. At the upper end of the main chute 132 is an adjustable chute 133 hinged to the carriage at 134 and adapted to be swung from the operative position, as shown in full lines in Fig. 15, upwardly into an inoperative position, as shown in broken lines in the same figure.

In order to bring the upper run of the conveyer belt into operative relation with the deflector 128, we provide on the carriage 111 a belt-elevating and supporting plate or table 135. This table is adjustable from a depressed or inoperative position, as shown in broken lines in Fig. 15, to an elevated position, as shown in full lines in the same figure. In the first or inoperative position, this plate permits the upper run of the conveyer belt 64 to rest upon the rollers 69, but when elevated, it carries the said belt upwardly into contact with the lower edge of the deflector 128, as illustrated in Fig. 15. The plate is supported in the present instance by means of pins insertible through apertures 136 in the plate structure and in the carriage and supported similarly in the lower or inoperative position. When elevated, the belt in that part embraced by the carriage 111 is elevated from the supporting roller 69 and moves flatly across the horizontal plate and as previously stated in contact with the deflector 128. As a result of this contact, the sand or other material on the belt is deflected into the chute 132 as previously set forth and is deposited on the sand bed. The movement of the carriage 111 is controlled by an operator as desired and may be moved in any direction and at the desired speed to give the desired distribution of sand upon the sand bed. It will be noted that the carriage 111 carries at each end a pair of rollers 137 which occupy positions directly in line with the opposite side edges of the belt when the latter is elevated on the table 135. These rollers prevent misalignment of the upper run of the conveyer belt.

When not in use, the carriage 111 is shifted to the end of the bridge structure, as shown in Fig. 1. The plate 135 is lowered to the inoperative position and the deflector 128 shifted to its inoperative position paralleling one side of the belt, in this position the carriage and its various parts interfering in no way with the normal operation of the belt in delivering the sludge to the cars or other receptacles at the side of the sand beds.

In conjunction with the aforedescribed apparatus, we employ means on the bridge structure for evenly distributing the new sand on the sand beds and for leveling the sand thereon. This spreading and leveling device comprises in one form a plurality of scrapers 138, these scrapers in the present instance corresponding in length to the lengths of the sections of the aforedescribed ribbon conveyer, these three sections of the scrapers covering the entire width of the sand bed over which the bridge structure operates. These are elevated and lowered through the medium of a series of cables 139 which operate around sheaves 141 on a shaft 142, this shaft being journaled as shown in Fig. 9 upon the framework of the bridge structure. The shaft 142 may be operated to lower the scraper into the position shown in broken lines in Fig. 9, in which position it is operative to bring the upper surface of the sand bed into a substantially flat and smooth condition. We also provide at the rear of each of the skimmer sections 25 a scraper element which assumes an operative position, as shown in Fig. 9, to follow after the skimmer 25 and to level off the sand after the teeth 26 have disturbed it in the sludge-collecting operation. It will be understood that this scraper 143, which may be raised and lowered by hand, operates to offset any disturbing effects of the skimmer 25, but when the scaper 138 is in operation, the skimmer 25 and the associated parts are elevated, the sand bed being free from sludge.

It is desirable that the speed of movement of the bridge structure over the bed may be variable as desired in accordance with the nature of the operations. In general, the bridge may be advanced at a more rapid rate while collecting and removing the sludge than when depositing and spreading the sand.

The apparatus as described above is capable of considerable modification without departure from the invention. Such a modification for example is shown in Fig. 16, in which a movable bridge structure substantially the same as that described above is shown. In this instance, however, the sludge skimmer 144 and elevator 145 are mounted upon a carriage 146 which is adapted to travel on rails longitudinally of the bridge structure. In this instance, the sludge is collected not by moving the bridge structure as a whole but by advancing the carriage 146 with the skimmer and elevator structure from one side of the sand bed to the other. The scoop 144 may be sufficient in width to cover the entire sand bed in one movement of the carriage 146, or it may be relatively narrow, the bridge structure being advanced bodily after each full movement of the sludge-collecting elements from one side of the sand bed to the other. In this instance, as before, the sludge is deposited by the collector elevator upon a conveyer belt 147 which takes the sludge to the end of the bridge structure and deposits it in a car or other vehicle provided for the purpose. In this instance also, it will be noted that the sludge collector and elevator apparatus is pivotally mounted at 148 and may be adjusted upwardly around this pivot to an inoperative position, shown in broken lines, by means of a rack bar 149 and a pinion 150 on the carriage which operates in conjunction with this bar and as illustrated to give the desired adjustable movement to the associated parts.

Figure 18:
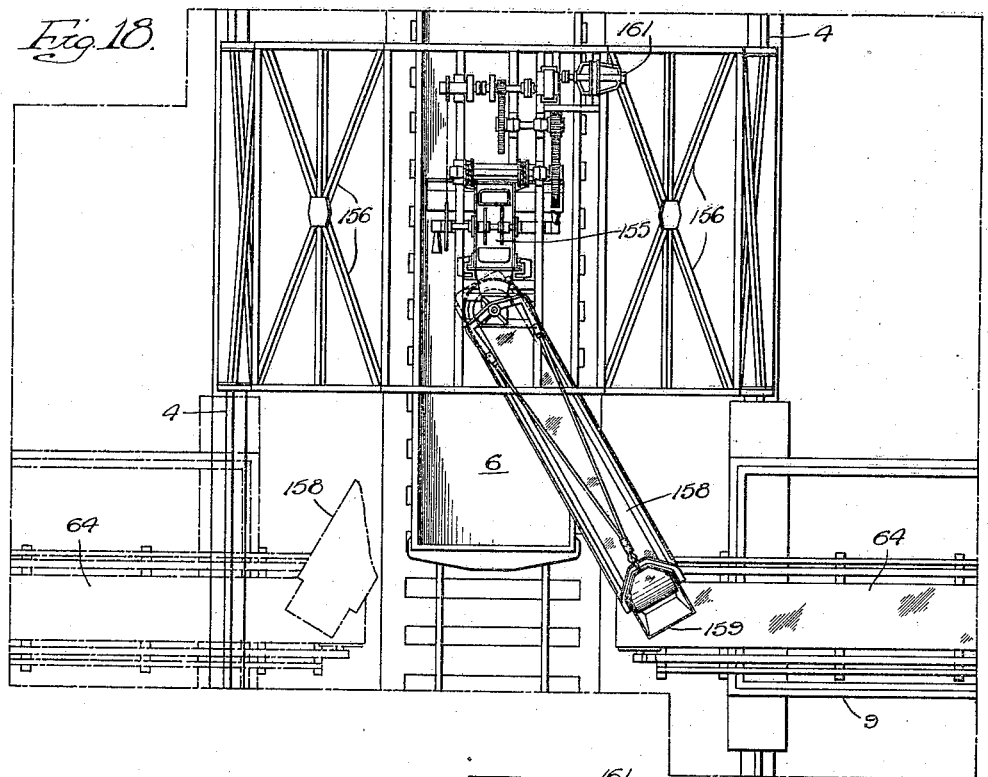
Figs. 18 and 19 are respectively plan and front elevational views showing the same modification.
Figure 19:
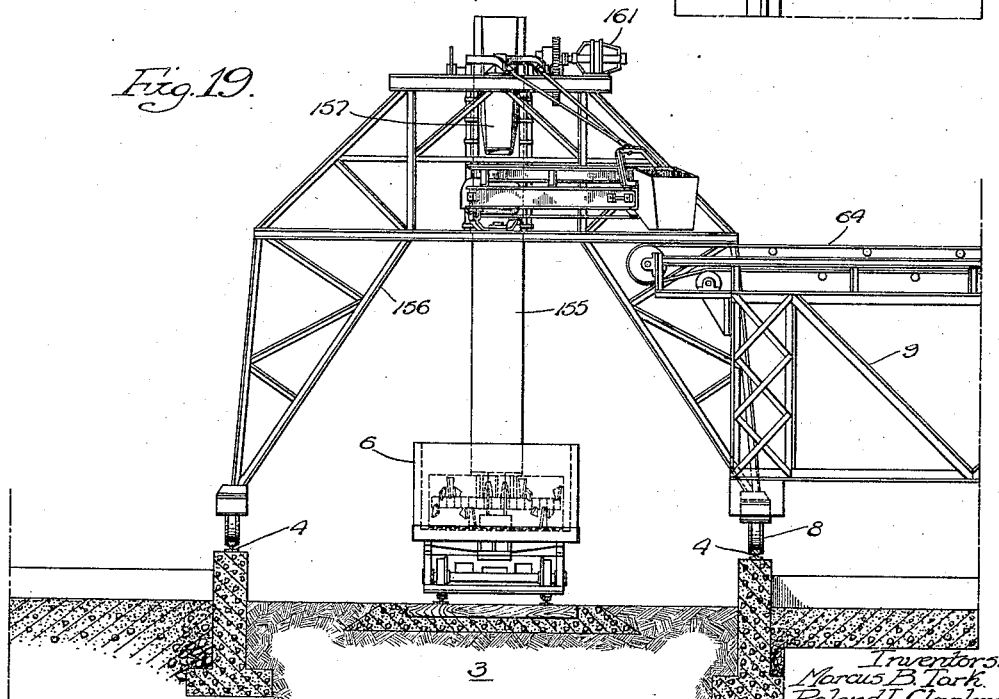

A further modification is illustrated in Figs. 17, 18 and 19. In this instance, the elevator conveyer, the principal function of which is to take up sand from a railroad car or other vehicle or source, is mounted upon a mobile structure independent of the other portion of the apparatus. In the present instance, this conveyer, designated in the drawings by the reference numeral 155, is mounted upon a frame structure 156 which straddles the spaces 3 intermediate the bed sections and is supported on wheels which travel on the rails 4, which also support the main structure. The elevator conveyer 155 may be in all respects similar to the corresponding elevator previously described. The present elevator 155, however, is adapted to deliver the material through a chute 157 to the inner end of a swiveling belt conveyer 158 which transfers the sand or other material through the medium of an end chute 159 to the main conveyer 64 of the sludge-cleaning apparatus. The elevator 155 and the conveyer 158 may be operated from an electric motor 161 mounted on the structure 156, power being provided to this motor by means for example, of flexible cables extending from the generator on the sludge bed cleaner.

Several advantages apply to this construction over that previously shown, in which the elevator conveyer is mounted upon the main frame of the sludge bed cleaner, the principal one residing in the fact that it eliminates the necessity for right and left hand machines and makes possible the operation of a single cleaner on all beds. As illustrated in Fig. 18, the swivel conveyer 158 is adjustable to either side of the frame.

Apparatus of the type of that herein described provides for collecting the sludge from the sand beds, and the preparation and care of the beds with practically an entire absence of manual labor, one moving bridge structure being sufficient to cover a relatively large area of sludge beds.

While a special construction of sludge bed such as that illustrated and described above is desirable to afford tracks upon which the sludge-removing apparatus may travel over the sand bed, it will be apparent that other means of locomotion such as tractor or caterpillar treads may be used if desired without departure from the invention.

We claim:

1. Apparatus for use in conjunction with sludge-drying beds and the like comprising a mobile structure adapted to travel at least in part over the said bed, means on said structure for skimming sludge from the surface of said bed, means including a transverse conveyer for delivering said sludge to a predetermined point of discharge on said structure, an elevator conveyer at one end of said structure and adapted to discharge onto said transverse conveyer, and means operatively associated with said transverse conveyer and selectively adapted to deflect material from the conveyer onto the said drying bed.

2. Apparatus for use in conjunction with sludge-drying beds and the like comprising a mobile structure adapted to travel at least in part over the said bed, means for skimming sludge from the surface of said bed, a transverse conveyer carried by said structure, means for conducting the said sludge from the skimming means to the transverse conveyer whereby the sludge is conducted on the said conveyer to a predetermined point of discharge, an elevator conveyer operative at one side of said bed and adapted to deliver material to said transverse conveyer, and means operatively associated with said conveyer for selectively deflecting material from the conveyer to be deposited on the said drying bed.

3. Apparatus for use in conjunction with sludge-drying beds and the like comprising a mobile structure adapted to travel at least in part over the said bed, a transverse conveyer carried by said structure, an elevator conveyer operative on said structure at one side of the filtering bed and adapted to deposit material on said transverse conveyer, and a traveling deflector operatively associated with said transverse conveyer and adapted to deflect material from the conveyer to be deposited upon the drying bed.

4. Apparatus for use in conjunction with sludge-drying beds and the like comprising a mobile structure adapted to travel at least in part over the said bed, a transverse conveyer carried by said structure, an elevator conveyer operative on said structure at one side of the drying bed and adapted to deposit material on said transverse conveyer, a traveling deflector operatively associated with said transverse conveyer and adapted to deflect material from the conveyer to be deposited upon the filtering bed, and means carried by said structure and adapted to level the surface of said bed, and means for adjusting said scraper.

5. Apparatus for use in conjunction with sludge-drying sand beds and the like comprising a mobile structure adapted to travel at least in part over the said bed, means carried by said structure for separating the sludge from the surface sand, means on said structure for conducting said sludge to a predetermined point of discharge, and means operative on the bed following said take-up means to level the sludge-free surface.

6. Apparatus for use in conjunction with sludge-drying beds and the like comprising a mobile structure adapted to travel at least in part over the said bed, a transverse conveyer carried by said structure, an elevator conveyer operative at one side of the bed and adapted to deposit material on said transverse conveyer, a deflector adapted to travel longitudinally of the belt and to deflect material from the conveyer onto the filter bed, and means for controlling the movement of said deflector relative to the belt to control the disposition of the material upon the drying bed.

7. Apparatus for use in conjunction with sludge-drying beds and the like comprising a mobile structure adapted to travel at least in part over the said bed, a transverse belt conveyer carried by said structure, an elevator conveyer operative on said structure at one side of the drying bed and adapted to deposit material on the said transverse conveyer, a carriage movable on the structure longitudinally of the said conveyer and adapted to embrace the upper run of the latter, means on said carriage for elevating and supporting that part of the conveyer belt embraced by the carriage, and a deflector element on said carriage adapted to operate on the elevated part of said belt conveyer to discharge a material from the belt onto the surface of the drying bed.

8. Apparatus for use in conjunction with sludge-drying beds and the like comprising a mobile structure adapted to travel at least in part over the said bed, a transverse belt conveyer carried by said structure, an elevator conveyer operative on said structure at one side of the drying bed and adapted to deposit material on the said transverse conveyer, a carriage movable on the structure longitudinally of the said conveyer and adapted to embrace the upper run of the latter, means on said carriage for elevating and supporting that part of the conveyer belt embraced by the carriage, and a deflector element on said carriage adapted to operate on the elevated part of said belt conveyer to discharge material from the belt onto the surface of the drying bed, said belt elevating and supporting means and said deflector being adjustable to inoperative positions relative to the conveyer.

MARCUS B. TARK.
ROLAND L. CLEVELAND.